(12) United States Patent
van den Berg et al.

(10) Patent No.: US 6,823,817 B2
(45) Date of Patent: Nov. 30, 2004

(54) METHOD OF AND A DEVICE FOR AUTOMATICALLY MILKING A DAIRY ANIMAL

(75) Inventors: Karel van den Berg, Bleskensgraaf (NL); Helena Geralda Maria Vijverberg, Maassluis (NL)

(73) Assignee: Lely Enterprises A.G., Zug (CH)

( * ) Notice: Subject to any disclaimer, the term of this patent is extended or adjusted under 35 U.S.C. 154(b) by 40 days.

(21) Appl. No.: 10/200,774

(22) Filed: Jul. 24, 2002

(65) Prior Publication Data

US 2003/0019431 A1 Jan. 30, 2003

(30) Foreign Application Priority Data

Jul. 25, 2001 (NL) .............................................. 1018633

(51) Int. Cl.[7] .................................................. A01J 3/00
(52) U.S. Cl. .................................. 119/14.02; 119/14.08
(58) Field of Search ........................... 119/14.02, 14.08, 119/14.14

(56) References Cited

U.S. PATENT DOCUMENTS

| | | | | |
|---|---|---|---|---|
| 5,704,311 A | * | 1/1998 | van den Berg | 119/14.02 |
| 5,743,209 A | * | 4/1998 | Bazin et al. | 119/14.08 |
| 5,832,868 A | * | 11/1998 | Oosterling | 119/14.02 |
| 5,873,323 A | | 2/1999 | van den Berg et al. | 119/14.02 |
| 6,038,030 A | * | 3/2000 | van den Berg | 119/14.08 |
| 6,257,169 B1 | * | 7/2001 | Oosterling | 119/14.02 |
| 6,493,071 B2 | * | 12/2002 | van den Berg et al. | 119/14.14 |

FOREIGN PATENT DOCUMENTS

| WO | WO 00/18218 | 4/2000 |
|---|---|---|
| WO | WO 01/17339 A1 | 3/2001 |

* cited by examiner

Primary Examiner—Charles T. Jordan
Assistant Examiner—Elizabeth Shaw
(74) Attorney, Agent, or Firm—Penrose Lucas Albright

(57) ABSTRACT

A method of automatically milking a dairy animal, in particular a cow. The method comprises: a) the step of activating the teat cup for milking the teat; b) the step of measuring a milking parameter during milking the teat during step a) for obtaining a value of the milking parameter, and c) the step of deactivating the teat cup when a deactivation threshold has been reached. The deactivation threshold is determined at least partially with the aid of the value of the milking parameter. A device for automatically milking a dairy animal, in particular a cow. Said device is provided with means for activating the teat cup for milking a teat of the dairy animal, means comprising a milking parameter for measuring a milking parameter during milking the teat for obtaining a value of the milking parameter, means for deactivating the teat cup, and means for generating a threshold signal indicating that a deactivation threshold has been reached. The deactivation means are put into operation with the aid of the threshold signal, the means for generating the signal indicating a deactivation threshold generating the signal at least partially with the aid of the value of the milking parameter.

16 Claims, 1 Drawing Sheet

METHOD OF AND A DEVICE FOR AUTOMATICALLY MILKING A DAIRY ANIMAL

FIELD OF THE INVENTION

The invention relates to a method and apparatus for automatically milking a dairy animal, in particular a cow, wherein a number of the milk's characteristics are monitored as the milking proceeds and the process is terminated or the milk is diverted if an abnormality is detected or a predetermined norm or parameter is reached.

BACKGROUND OF THE INVENTION

Such a method and device are known from the International Application No. PCT/US99/18742, International Publication No. WO 00/18218, of Gompper et al, published Apr. 6, 2000, for a milk flow monitor and milker unit detacher. Although in such application numerous possibilities are described with respect to the moment when milking by means of a teat cup is stopped, at the present moment there appears still to be a need for a method and a device by means of which it is possible to determine for each dairy animal individually the moment when milking can be stopped, so that a dairy animal can optimally be milked with respect to inter alia udder health and the like.

SUMMARY OF THE INVENTION

It is an object of the invention to supply the above need.

For that purpose, according to a first aspect of the invention, a method of the above-described type comprises deactivation of a teat cup when a deactivation threshold value is reached on a milk characteristic being monitored, such threshold value being arrived at based on, at least in part, the value of a milking parameter. Due to the fact that the deactivation threshold is determined at least partially based on the value of the milking parameter, the deactivation threshold can be adapted to the present momentary situation and the values of the milking parameter measured at the moment can be taken into account. This provides a considerable improvement relative to the existing pre-set deactivation thresholds.

The milking parameter is preferably selected from a group consisting of milk flow, milk yield, milk temperature, electric conductivity of the milk, fat content of the milk, protein content of the milk, cell count of the milk, intervals between milk gushes, duration of the milk gushes, and the peak and off-peak values of the mentioned milking parameters. Although other parameters may also be applied, these parameters appear to be the most efficient ones for determining the deactivation threshold.

It is particularly advantageous when, for the value of the milking parameter, an average value is selected. Due to this, fluctuations or temporary perturbations present by nature in the measured values are averaged, and a more accurate determination of the deactivation threshold becomes possible.

In an embodiment of a method according to the invention the method comprises the step of recording in a step (a) a starting time from which the average value of the milking parameter is determined. As a starting time from which the average value of the milking parameter is preferably determined the starting point of time when the milk flow in step (a) starts. In some cases the selected milking parameter shows strongly fluctuating values at the beginning of the start of the milk flow, so that it is advantageous to determine, as a starting time from which the average value of the milking parameter is determined, a point of time after the starting time when the milk flow in step (a) starts. Such a period of time may vary, depending on the milking parameter, between a few seconds and a few tens of seconds.

The average value of the milking parameter is preferably recorded continuously from the starting time. Although continuously recording the average value requires considerable calculation capacity, this results in extremely accurate values.

In an embodiment of a method according to the invention, the method comprises the step of determining and storing the momentary value of the milking parameter. Here by "storing" is meant retaining the value of the milking parameter at least as long as is necessary for processing the value.

Although the value of the milking parameter may be used as such to deactivate the teat cup, it is preferred when a mathematical function is applied to the value of the milking parameter for obtaining a threshold milking parameter value. By selecting the function based on the desires of a manager or farmer the deactivation of the teat cup accordingly can be adapted to his own views.

In an advantageous embodiment of a method according to the invention, the method comprises the step of comparing the momentary value of the milking parameter with the threshold milking parameter value, the step of deactivating the teat cup preferably being carried out when the momentary value of the milking parameter equals or is lower than the threshold milking parameter value. For being insensitive to usually occurring fluctuations or perturbations, the step of deactivating the teat cup is preferably carried out when the momentary value of the milking parameter equals or is lower than the threshold milking parameter value during a period of time. The period of time is preferably adjustable, in particular between approximately two seconds and approximately nine seconds.

The termination of the milking can be accomplished without unfavorably influencing the udder health, in that the method comprises the step of storing in a memory of a computer a number of ranges of average milking parameter values, and of storing in a memory of the computer a respective threshold milking parameter value corresponding with a certain range. For example, with cows, at the following average milk flows: (a) more than 500 ml/min.; (b) between 370 and 500 ml/min.; (c) between 250 and 370 ml/min.; (d) between 170 and 250 ml/min., and (e) less than 170 ml/min., the following threshold milk flows respectively appear to provide good results: (a) 400 ml/min.; (b) 120 ml/min.; (c) 50 ml/min.; (d) 30 ml/min.; and (e) 20 ml/min.

When comparing the average milking parameter value with the ranges stored in the memory demonstrates that the momentary value of the milking parameter value equals or is lower than the threshold milking parameter value corresponding with the average milking parameter value, deactivation of the teat cup can take place.

In an embodiment of a method according to the invention, in which the method comprises the step that, when the average of the threshold milking parameter value equals or is lower than the threshold milking parameter value, deactivation of the teat cup takes place when the momentary value of the milking parameter equals or is lower than the threshold milking parameter, a deactivation of the teat cup takes place each time when the threshold milking parameter has been reached. This prevents the teat from being milked too long.

Based on long research it has been found that a quick deactivation of the teat cup, for example when it is expected that many dairy animals will have to be milked within a short period of time, is carried out correctly when the function consists in dividing the value by three. A deactivation which is not so expedited, in contrast, takes place when the function consists in dividing the value by five. It will be appreciated that the indicated values are thus guide values, which may be deviated based on experience.

The method preferably comprises the step of determining, during obtaining a milk flow, the values of several milking parameters, the deactivation threshold being determined at least partially with the aid of the values of at least two measured milking parameters. Thus it is possible to take into account several values obtained during milking for deactivating the teat cup.

Although by means of the inventive method a deactivation threshold is determined during milking, in some cases it may be advantageous that the method comprises the step of determining, during obtaining a milk flow, the value of at least one milking parameter, and that the deactivation threshold is determined at least partially based on the value of the at least one measured milking parameter and a predetermined milking parameter value which is in particular based on historical data. Accordingly, there is already a deactivation threshold from the beginning of the milking, said deactivation threshold being adapted during milking, according to the invention, with the aid of values of the milking parameters. It is noticed that the deactivation threshold obtained after the milking has ended may be used as a predetermined threshold for the next milking run.

In an embodiment of a method according to the invention the method comprises the step of determining the difference between the momentary value of the milking parameter and the predetermined milking parameter value which is in particular based on historical data. Such a deviation may also be used for determining the deactivation threshold.

It has been found to be in particular practical when during step (a) the value of the momentary milk flow, the value of the average of the milk flow and the value of the momentary electric conductivity of the milk obtained are determined. When the method additionally comprises the step of storing the average, historical electric conductivity of the milk produced by the teat based on historical data, by determining the difference between the momentary electric conductivity and the average, historical electric conductivity, there may be obtained a deactivation threshold which is advantageous with respect to udder health.

Alternatively or additionally an advantageous method according to the invention comprises the step of connecting at least one further teat cup to a further teat of the dairy animal, and the step of determining the electric conductivity of the milk obtained from said further teat.

When the method comprises the step of determining the teat which, in comparison with the other teats, produces at one point of time milk with the lowest electric conductivity, and of determining for every other teat the deviation from the conductivity of the milk produced by that other teat relative to the milk obtained from the teat producing the milk with the lowest conductivity, the step of deactivating the teat cup may be carried out at a point of time depending on the average milk flow and the difference in electric conductivity. As known, the electric conductivity may be used as an indication of possible mastitis, and the ending of the milking may be adapted thereto in this case by taking this electric conductivity into account. At an increased electric conductivity the point of time when the teat cup is deactivated is preferably postponed.

When the measured deviation is greater than a predetermined value, it is preferred when not the exact average milk flow, but a compensated average milk flow is taken as a starting time for deactivating the teat cup. This compensated average milk flow is in particular obtained in an advantageous manner when the method comprises the step of applying a mathematical function to the value of the average milk flow and the difference in electric conductivity for obtaining a compensated threshold milk flow average.

Based on long research it has been found advantageous that, when the deviation is greater than 10%, a function consisting in multiplying the average milk flow by ten and in dividing it by the difference in electric conductivity ensures that deactivation of the teat cup takes place at a point of time which is appropriate with respect to udder health.

Although disconnection of the teat cup may take place simultaneously with deactivation of the teat cup, it is preferred when the step of disconnecting the teat cup is carried out after a predetermined period of time has elapsed after deactivation of the teat cup. Said period of time is in particular adjustable. The period of time is preferably adjustable between approximately two seconds and approximately fifteen seconds.

Although the inventive method is applicable in a conventional, automatic method of milking, the method is in particular advantageous when the automatic milking is carried out by a milking robot. Particularly advantageous is an embodiment of a method according to the invention in which the admission criterion for the milking robot is at least partially adapted based on the value of the milking parameter measured during step (a), or the measured deviation, or both. Although the measured value indicates the momentary situation, it may be nevertheless used for adapting the admission criterion. When the measured value indicates, for example, that the dairy animal is ill, the admission criterion may be altered in such a manner that the sick animal is not admitted. Moreover the measured value may indicate that the dairy animal has developed or changed, so that an adaptation of the admission criterion is desired. Such an adaptation of the criterion on the basis of the measured value may be carried out by a person skilled in the art without further data being required.

The invention further relates to an apparatus for performing the above-described method. The invention particularly relates to an apparatus of the above-described type which is characterized by means for generating a signal that indicate a deactivation threshold wherein the signal is based at least partially on a milking parameter value.

BRIEF DESCRIPTION OF THE DRAWINGS

The invention will be disclosed hereinafter with reference to an embodiment shown in the drawing, in which.

DETAILED DESCRIPTION OF THE PREFERRED EMBODIMENTS

Figure 1:
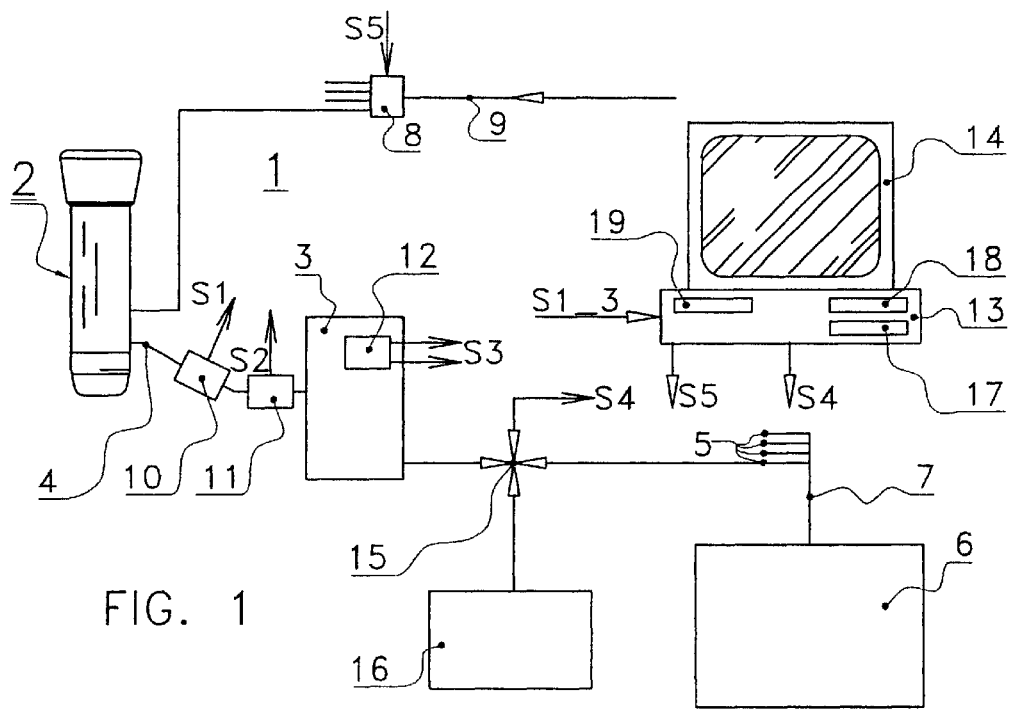
FIG. 1 is a schematic arrangement of an apparatus according to the invention, provided with one teat cup.

The invention will be described with reference to the first embodiment of an apparatus generally designated by reference numeral 1 for automatically milking a dairy animal, such as a cow, wherein one teat cup 2 is shown in FIG. 1.

The measures of the inventive method will be set out clearly in the description with respect to the apparatus. Moreover, the invention will be explained in further detail by way of example with reference to a limited number of specifically mentioned milking parameters. However, it will be appreciated that also other milking parameters than those described in the claims, may be used. A person skilled in the art will thus understand that by experimental research, variation of a milking parameter can be measured during the milking process. Such deviation may then be used, possibly processed by a mathematical formula, for determining at least partially the deactivation threshold.

Teat cup 2 shown in FIG. 1 may be automatically connected and disconnected to or from a teat of a cow by means of a milking robot which is not shown in the figures. The milk yielded per udder quarter by means of teat cup 2 may be supplied via its own separate milk line 4 to a corresponding milk quantity meter or milk glass 3. A discharge line 5 of milk glass 3 is coupled to a line 7 extending to a bulk milk cooling tank 6. As known, apparatus 1 further comprises a pulsator system 8 for each teat cup 2. The vacuum line 9 for the pulsator system 8 is connected in a usual manner to a vacuum pump with a balance tank.

In an obliquely downwardly extending portion of milk line 4 is a milk flow meter 10 for establishing the start of milk flow and for determining the value of the milk flow during milking, or in other words, during the time when the teat cup is active. Said milk flow meter 10 operates in this example on the basis of the creation by a milk flow of an electric connection between two electrodes. The tilted position of milk flow meter 10 prevents milk from remaining between the electrodes, or in other words, prevents a small quantity of milk from being present between the electrodes which would of course result in a milk flow being permanently observed. In the region of milk flow meter 10 milk line 4 has preferably such a diameter that irrespective of the milk flow present therein, the milk line is always completely filled.

In milk line 4 there is also included a temperature meter 11 for establishing the milk temperature. The milk temperature is a good measure for the body temperature; with sick cows, such as cows affected by mastitis, the body temperature is higher than normal.

In milk glass 3 a conductivity meter 12 is disposed for determining the electric conductivity, for example, for establishing mastitis or another infectious illness. Said conductivity meter 12 comprises a reservoir with electrodes for measuring the electric conductivity of the milk present in the reservoir. At each new milk flow the milk present in the reservoir is replaced. When the milk is affected, then an increased electric conductivity is established. Because for each new milk flow there is observed in the beginning a small increase of the electric conductivity, it is also possible to establish the start of a milk flow by using this mastitis sensor instead of milk flow meter 10 or in addition thereto.

The outgoing signals S1, S2 and S3 of the respective meters 10, 11 and 12 are supplied to a computer 13 in which the information from these meters will be further processed, as will be set forth hereinafter, and may be made visible on a display screen 14.

Between line 5 and line 7 is further a three-way valve 15 for discharging the milk flow from a quarter affected by mastitis of the udder of the cow to a waste tank 16. When, on the basis of the information communicated by computer 13, the farmer decides to discharge milk to the waste tank 16 and provides for that purpose an appropriate command to computer 13, three-way valve 15 is switched over by means of a signal S4 supplied by computer 13. Computer 13 may transmit this signal S4 automatically to the three-way valve 15.

According to the invention computer 13 may determine on the basis of the data from milk flow meter 10 the starting time when the milk flow begins and preferably store said staring time (temporarily or permanently). Also the momentary milk flow as measured by milk flow meter 10 may be stored by computer 13. From these data computer 13 continuously determines the average milk flow. Determination of the average milk flow may begin at the moment when the milk flow starts or, for not taking into account the first measurements which may usually contain noise or deviating values, when a predetermined period of time after the start of the milk flow, such as after a period from ten to fifty seconds, has elapsed. It is noticed that by storage is meant that the computer retains the data, at least as long as necessary for processing them. For storing the data, computer 13 comprises one or more memories 17 (in the embodiment shown only one memory is depicted for the sake of simplicity).

Computer 13 comprises a processing member 18 suitable for applying a mathematical function to the value of the average milk flow. As a result of the mathematical function a threshold milk flow average is obtained. Based on desires of the operator, a suitable function may be selected. However, based on long research it has been learned that for a quick deactivation of the teat cup, the function of dividing by three is highly appropriate irrespective of the individual cow. It has been further learned that for a deactivation which is not "quick" the function of dividing by five is highly appropriate irrespective of the individual cow.

Computer 13 further comprises a comparator 19 for comparing the momentary milk flow with the calculated threshold milk flow average. When the comparison indicates that the momentary mil flow equals or is lower than the calculated threshold milk flow average (functioning as a deactivation threshold), computer 13 supplies a signal S5 controlling the deactivation of teat cup 2. For example the deactivation may be due to the fact that signal S5 controls pulsation system 8 in such a manner that the vacuum is removed from teat cup 2.

Based on extensive research it has also been discovered that it is possible to describe the average milk flow produced by cows in certain milk flow ranges, and to allocate a certain threshold milk flow value to each of those milk flow ranges. Such milk flow ranges and corresponding threshold milk flows are stored in memory 17 of computer 13. An example of such ranges is represented hereinafter in table I.

TABLE I

| Average milk flow range (ml/min) | Threshold milk flow (ml/min) |
|---|---|
| >500 | 400 |
| 370–500 | 120 |
| 250–370 | 50 |
| 170–250 | 30 |
| <170 | 20 |

Comparator 19 of computer 13 compares the measured average milk flow with the ranges stored in the memory, and computer 13 determines the corresponding threshold milk flow. When the momentary milk flow equals or is lower than the threshold milk flow, the computer supplies signal S5 for deactivation of teat cup 2.

As a threshold milk flow value also other predetermined threshold values may be used such as those based on historical data.

The signals issued by the meters 11 and 12 during milking may be averaged over a certain period of time, such as over twenty-four hours, or over a number of milking runs or a combination of both. As the cow will be milked several times per day, this average value may each time be calculated as a progressive average. Conductivity meter 12 thus determines the momentary electric conductivity of the milk obtained and computer 13 ensures the storage of the average, historical electric conductivity of the teat based on historical data.

This average, historical electric conductivity, provides an indication about this parameter for that teat of that particular cow. When comparator 19 of computer 13 compares the momentary electric conductivity with the average, historical electric conductivity which is stored in memory 17 of computer 13, the difference between these values can be determined by computer 13. Of course, an animal identification system which is well known in the art may be used which, for the sake of simplicity is not detailed further.

When the difference exceeds a certain preset value, the relevant teat may be infected, and computer 13 may issue relevant signals for taking the necessary measures. In particular it is of importance for the health of the relevant cow that the teat is milked in another manner than when a normal conductivity value is detected. For that purpose the means, in the present case pulsation system 8, for deactivating the teat cup 2 is put into operation by computer 13 at a point of time depending on the measured average milk flow and the difference in electric conductivity. In particular computer 13 applies a mathematical function both to the value of the average milk flow and to the difference in electric conductivity for obtaining a so-called compensated threshold milk flow average. It is then preferred that the function is such that with a raised conductivity the deactivation takes place at an other point of time than usual, whereby the teat will be milked longer.

After long research it has been learned to be advantageous that, when the deviation is greater than 10%, a function consisting in multiplying the average milk flow by ten and in dividing it by the difference in electric conductivity ensures that the deactivation of the teat cup takes place at a point of time which is appropriate with respect to udder health.

It goes without saying that the average milk flow may also be used in combination with other milking parameters for placing the means for deactivating the teat cup into operation. When for example during milking temperature meter 11 issues a value which clearly deviates from the relevant average value, that it is outside a certain tolerance range around the average value, this may be an indication of illness of the cow. Computer 13 may then be programmed so that in this case teat cup 2 is immediately deactivated and disconnects from the teat. Moreover, computer 13 may provide a warning signal to the farmer.

Figure 2:
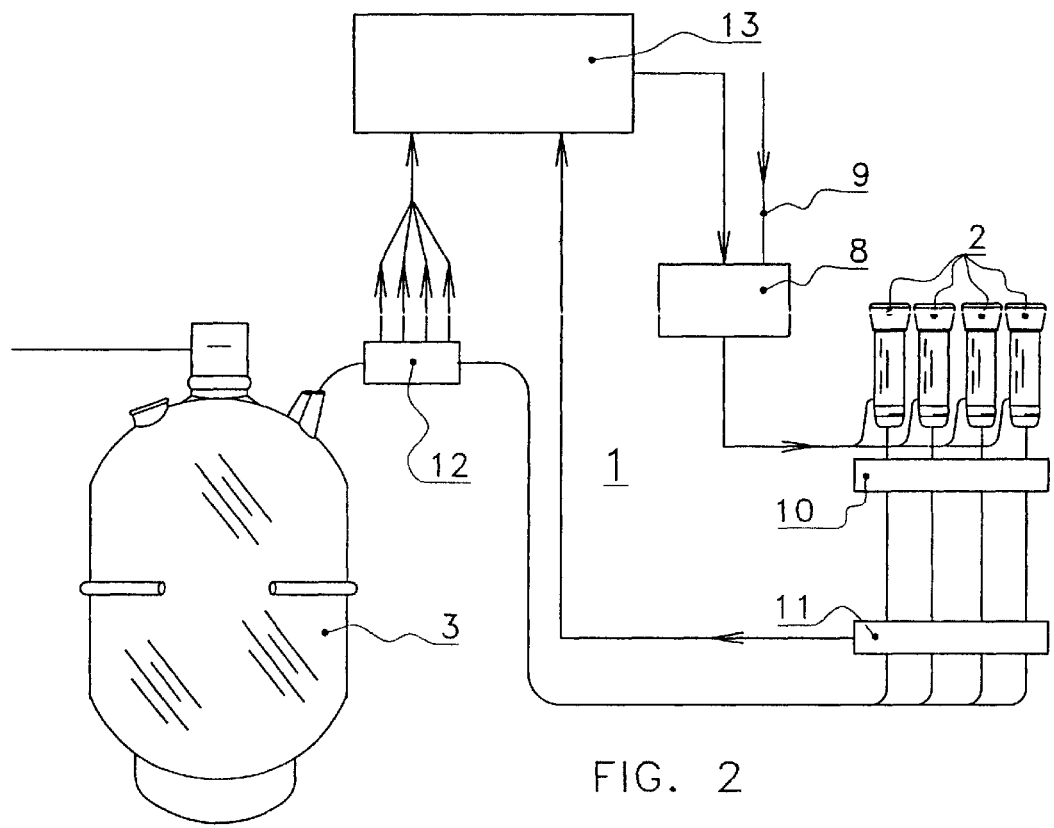
FIG. 2 is a schematic arrangement of an apparatus according to the invention, provided with four teat cups.

In the embodiment shown in FIG. 2, apparatus 1 comprises four teat cups 2. Each of teat cups 2 can be connected to a teat of a cow. Of the milk produced by each of the teat cups 2 the milk flow is determined by milk flow meter 10, temperature by temperature meter 11, and electric conductivity by conductivity meter 12. These data are used according to the embodiment described with reference to FIG. 1.

However, in the embodiment of FIG. 2 computer 13 determines the teat (teat cup 2) from which at one point of time the milk has the lowest electric conductivity. For every other teat (teat cup 2) computer 13 determines the deviation from the electric conductivity of the milk produced by that other teat relative to the lowest conductivity of the milked obtained from the teat producing the milk with the lowest conductivity. In a manner analogous to that of the above-described embodiment the difference in the conductivity of the milk between the teats (teat cups 2) may be an indication of an infection in at least one of the teats. Like in the embodiment of FIG. 1 it is then advantageous that means for deactivating the teat cup are put into operation by the computer at a point of time depending on the average milk flow and the difference in electric conductivity. It has appeared that as a function, the same function, that is multiplying the average milk flow by ten and dividing it by the difference in electric conductivity, can be used advantageously.

Besides the means for deactivating the teat cup, apparatus 1 may comprise a milking robot such as is well known in the art, said milking robot comprising means for automatically connecting and disconnecting the teat cups. These means may be identical to or integrated into the means for deactivating the teat cups. However, the computer is preferably suitable for determining a period of time from deactivation of the teat cup and for placing the means for disconnecting the teat cups into operation when the period of time has reached a certain time threshold value. The time threshold value is preferably adjustable, a range between approximately two seconds and approximately fifteen seconds appearing to be advantageous.

It will be appreciated that in some cases it is advantageous not to deactivate the teat cup immediately when the momentary value of the milking parameter equals or is lower than the threshold milking parameter value, but only when this situation occurs during a period of time, said period of time being adjustable such as between approximately two seconds and approximately nine seconds. In particular the period of time amounts to three seconds.

Average values may be determined from further signals which may be deduced from combinations of signals issued by several sensors. In particular by the milk flow meter in combination with the quantity of milk per milking run collected in milk glass 3, signals may be deduced being a measure for the milk velocity or the milk yield or both. Also the value of these signals may be averaged. The mentioned averaging processes are carried out in computer 13 and will all relate to a particular animal or a particular group of animals or a particular period of time, or a combination thereof. The signals issued by one or more sensors during milking of separate animals and having a value deviating from this average value, may always be an indication that something is wrong with the health of the relevant teats. Such an indication may be provided by computer 13 on an attention list, that is, both be made visible on display screen 14 of computer 13 and be printed. In addition, an alarm may be provided such as in the form of control lights to be disposed on the equipment or via the mobile telephone of the farmer.

Although we have disclosed the preferred embodiments of our invention, it is to be understood that it is capable of other adaptations and modifications within the scope of the following claims.

What is claimed is:

1. A method for use in an automated milking process which method comprises: establishing a range of anticipated milk flows from an udder quarter of the animal being milked and storing said range in the memory of a computer which is operatively associated with a comparator; automatically placing a teat cup on a teat which draws milk from said udder quarter of said animal; continuously measuring the rate of milk flow from said teat into said teat cup and comparing said milk flow as being measured by said comparator with said range; and deactivating and removing said teat from said teat cup when said measured rate of milk flow from said teat is equal to or less, as determined by said comparator, than a predetermined threshold value which is below said range.

2. A method in accordance with claim 1 wherein said range is greater than 500 milliliters per minute and said threshold value is about 400 milliliters per minute.

3. A method in accordance with claim 1, wherein said range is between 370 and 500 milliliters per minute and said threshold value is about 120 milliliters per minute.

4. A method in accordance with claim 1, wherein said range is between 250 and 370 milliliters per minute and said threshold value is about 50 milliliters per minute.

5. A method in accordance with claim 1, wherein said range is between 170 and 250 milliliters per minute and said threshold value is about 30 milliliters per minute.

6. A method in accordance with claim 1, wherein said range is less than 170 milliliters per minute and said threshold value is about 20 milliliters per minute.

7. A method in accordance with claim 1, wherein said threshold value is about one-third of the average of said range.

8. A method in accordance with claim 1, wherein said threshold value is about one-fifth of the average value of said range.

9. An apparatus for use in an automated milking process which apparatus comprises: means for establishing a range of expected milk flows from a teat of an udder quarter of the animal being milked and storing said range in the memory of a computer which includes a comparator; a milking robot for automatically placing a teat cup on said teat from said udder quarter; measuring means for continuously measuring the rate of milk flow from said teat into said teat cup and comparing said rate of milk flow as it is measured in said comparator with said range; and deactivating means for deactivating said teat cup from further milking said udder quarter when said measured rate of milk flow from said teat is equal to or less, as determined by said comparator, than a predetermined threshold value which is below said range.

10. An apparatus in accordance with claim 9, wherein said range is greater than 500 milliliters per minute and said threshold value is about 400 milliliters per minute.

11. An apparatus in accordance with claim 9, wherein said range is between 370 and 500 milliliters per minute and said threshold value is about 120 milliliters per minute.

12. An apparatus in accordance with claim 9, wherein said range is between 250 and 370 milliliters per minute and said threshold value is about 50 milliliters per minute.

13. An apparatus in accordance with claim 9, wherein said range is between 170 and 250 milliliters per minute and said threshold value is about 30 milliliters per minute.

14. An apparatus in accordance with claim 9, wherein said range is less than 170 milliliters per minute and said threshold value is about 20 milliliters per minute.

15. An apparatus in accordance with claim 9, wherein said threshold value is about one-third of the average of said range.

16. An apparatus in accordance with claim 9, wherein said threshold value is about one-fifth of the average of said range.

* * * * *